United States Patent
Joshi et al.

(10) Patent No.: US 10,320,938 B2
(45) Date of Patent: Jun. 11, 2019

(54) MONITORING AND MAINTAINING SOCIAL GROUP COHESIVENESS

(71) Applicant: International Business Machines Corporation, Armonk, NY (US)

(72) Inventors: Vikas Joshi, Bangalore (IN); Deepak S. Padmanabhan, Kochi (IN); Srikanth Govindaraj Tamilselvam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 386 days.

(21) Appl. No.: 15/013,785

(22) Filed: Feb. 2, 2016

(65) Prior Publication Data

US 2017/0223133 A1 Aug. 3, 2017

(51) Int. Cl.
    G06F 15/173    (2006.01)
    H04L 29/08     (2006.01)
    H04L 12/58     (2006.01)

(52) U.S. Cl.
    CPC ............ H04L 67/306 (2013.01); H04L 51/24 (2013.01); H04L 51/32 (2013.01); H04L 67/22 (2013.01); H04L 51/02 (2013.01); H04L 51/16 (2013.01)

(58) Field of Classification Search
    USPC .......................... 709/220, 206, 204; 370/473
    See application file for complete search history.

(56) References Cited

U.S. PATENT DOCUMENTS

| | | | |
|---|---|---|---|
| 7,191,150 B1 * | 3/2007 | Shao ............... | G06Q 10/06312 705/38 |
| 8,135,618 B1 * | 3/2012 | Friedlander ........ | G06Q 30/0242 705/14.41 |
| 8,401,248 B1 | 3/2013 | Moon et al. | |
| RE44,559 E | 10/2013 | Flinn et al. | |
| 8,572,277 B2 | 10/2013 | Morris et al. | |
| 8,638,190 B1 * | 1/2014 | Want ...................... | G06F 3/046 340/5.1 |
| 8,775,324 B2 | 7/2014 | Zhu et al. | |
| 8,825,777 B2 | 9/2014 | DeLuca et al. | |
| 9,886,828 B1 * | 2/2018 | Tavares ................... | G06F 19/00 |
| 10,043,189 B1 * | 8/2018 | Jones ...................... | G10L 17/22 |
| 10,185,924 B1 * | 1/2019 | McClintock ....... | G06Q 10/0635 |

(Continued)

FOREIGN PATENT DOCUMENTS

WO    WO2013140410 A1    9/2013

OTHER PUBLICATIONS

Jo, Yohan et al., "Aspect and Sentiment Unification Model for Online Review Analysis", WSDM'11, Hong Kong, China, Feb. 9-12, 2011, 10 pages, ACM Digital Library.

*Primary Examiner* — Thanh T Nguyen
(74) *Attorney, Agent, or Firm* — Ference & Associates LLC

(57) ABSTRACT

One embodiment a method for ensuring group cohesiveness, the method including: utilizing at least one processor to execute computer code that performs the steps of: obtaining community information associated with a group; generating, based on the community information, a group profile; detecting a user action; determining, based on the group profile, if the user action negatively affects group cohesiveness; and generating, based on the determining, a notification. Other aspects are described and claimed.

15 Claims, 5 Drawing Sheets

(56) References Cited

U.S. PATENT DOCUMENTS

| | | | |
|---|---|---|---|
| 2002/0151321 A1* | 10/2002 | Winchell | G06Q 30/02 455/519 |
| 2005/0283495 A1* | 12/2005 | Wu | G06N 5/022 |
| 2006/0023750 A1* | 2/2006 | Kim | H04J 3/1605 370/473 |
| 2006/0230112 A1* | 10/2006 | Henderson | H04L 51/04 709/206 |
| 2007/0208718 A1* | 9/2007 | Javid | G06F 17/30017 |
| 2008/0172412 A1 | 7/2008 | Gruhl et al. | |
| 2008/0189380 A1 | 8/2008 | Bosworth et al. | |
| 2009/0048938 A1* | 2/2009 | Dupray | G06Q 30/02 705/27.1 |
| 2009/0144377 A1* | 6/2009 | Kim | G06Q 10/10 709/206 |
| 2009/0204898 A1* | 8/2009 | Jones | G06F 17/30029 715/719 |
| 2010/0063829 A1* | 3/2010 | Dupray | G06Q 30/0603 705/313 |
| 2011/0196927 A1 | 8/2011 | Vance | |
| 2013/0117407 A1* | 5/2013 | O'Sullivan | H04L 63/10 709/217 |
| 2013/0336594 A1* | 12/2013 | Dorairaj | H04N 19/126 382/250 |
| 2013/0340089 A1 | 12/2013 | Steinberg et al. | |
| 2014/0046727 A1 | 2/2014 | Stanasolovich et al. | |
| 2016/0036939 A1* | 2/2016 | Freund | H04L 67/306 709/204 |
| 2016/0140633 A1* | 5/2016 | Hiller | G06Q 30/0609 705/26.35 |
| 2016/0232131 A1* | 8/2016 | Liu | G06F 17/211 |
| 2016/0232201 A1* | 8/2016 | Goran | G06F 17/30386 |
| 2016/0232244 A1* | 8/2016 | Liu | G06F 17/30867 |
| 2016/0234184 A1* | 8/2016 | Liu | H04L 63/08 |
| 2016/0234595 A1* | 8/2016 | Goran | H04R 3/002 |
| 2017/0185754 A1* | 6/2017 | Jefferson | G06F 17/21 |
| 2018/0137121 A1* | 5/2018 | Agarwal | G06F 17/30035 |

* cited by examiner

MONITORING AND MAINTAINING SOCIAL GROUP COHESIVENESS

BACKGROUND

Social media are growing both in complexity and scale. More instances of social media are being created, and more people are taking an active role in social media than ever before. One of the driving forces behind why social media are so popular is that these media allow users to interact with people with whom they would not normally be able to interact. These interactions may be between existing friends who have grown distant or between individuals who would have never met without the use of social media.

One of the most common ways for people to meet or organize using social media is through the use of groups. Groups may form in the social media context due to a variety of factors. For example, a group may be created based on user interests, user political beliefs, user experiences, user religious beliefs, or any concept a group of people may share an interest in. However, as with most groups, it is possible for divisiveness to grow between members. This can be caused to a variety of factors, but mostly it is due to a lack of group cohesiveness. The dynamic of a group can change over time, and thus needs to be monitored and controlled in order to allow the group to properly thrive.

BRIEF SUMMARY

In summary, one aspect of the invention provides a method for monitoring and maintaining social group cohesiveness, the method comprising: utilizing at least one processor to execute computer code that performs the steps of: obtaining community information associated with a group; generating, based on the community information, a group profile; detecting a user action; determining, based on the group profile, if the user action negatively affects group cohesiveness; and generating, based on the determining, a notification.

Another aspect of the invention provides an apparatus for monitoring and maintaining social group cohesiveness, the apparatus comprising: at least one processor; and a computer readable storage medium having computer readable program code embodied therewith and executable by the at least one processor, the computer readable program code comprising: computer readable program code that obtains community information associated with a group; computer readable program code that generates, based on the community information, a group profile; computer readable program code that detects a user action; computer readable program code that determines, based on the group profile, if the user action negatively affects group cohesiveness; and computer readable program code that generates, based on the determining, a notification.

An additional aspect of the invention provides a computer program product for monitoring and maintaining social group cohesiveness, the computer program product comprising: a computer readable storage medium having computer readable program code embodied therewith, the computer readable program code comprising: computer readable program code that obtains community information associated with a group; computer readable program code that generates, based on the community information, a group profile; computer readable program code that detects a user action; computer readable program code that determines, based on the group profile, if the user action negatively affects group cohesiveness; and computer readable program code that generates, based on the determining, a notification.

A further aspect of the invention provides a method, comprising: utilizing at least one processor to execute computer code that performs the steps of: creating a community profile based on community information; wherein the community information is at least one of: community discussions, community topics, external reviews, and group members; receiving input from a user, the input comprising at least one of: a membership request and a post request; identifying, based on the user input and the community profile, a potential negative impact on group cohesiveness; and responsive to the identifying, generating a notification to at least one of: the user and a community moderator.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
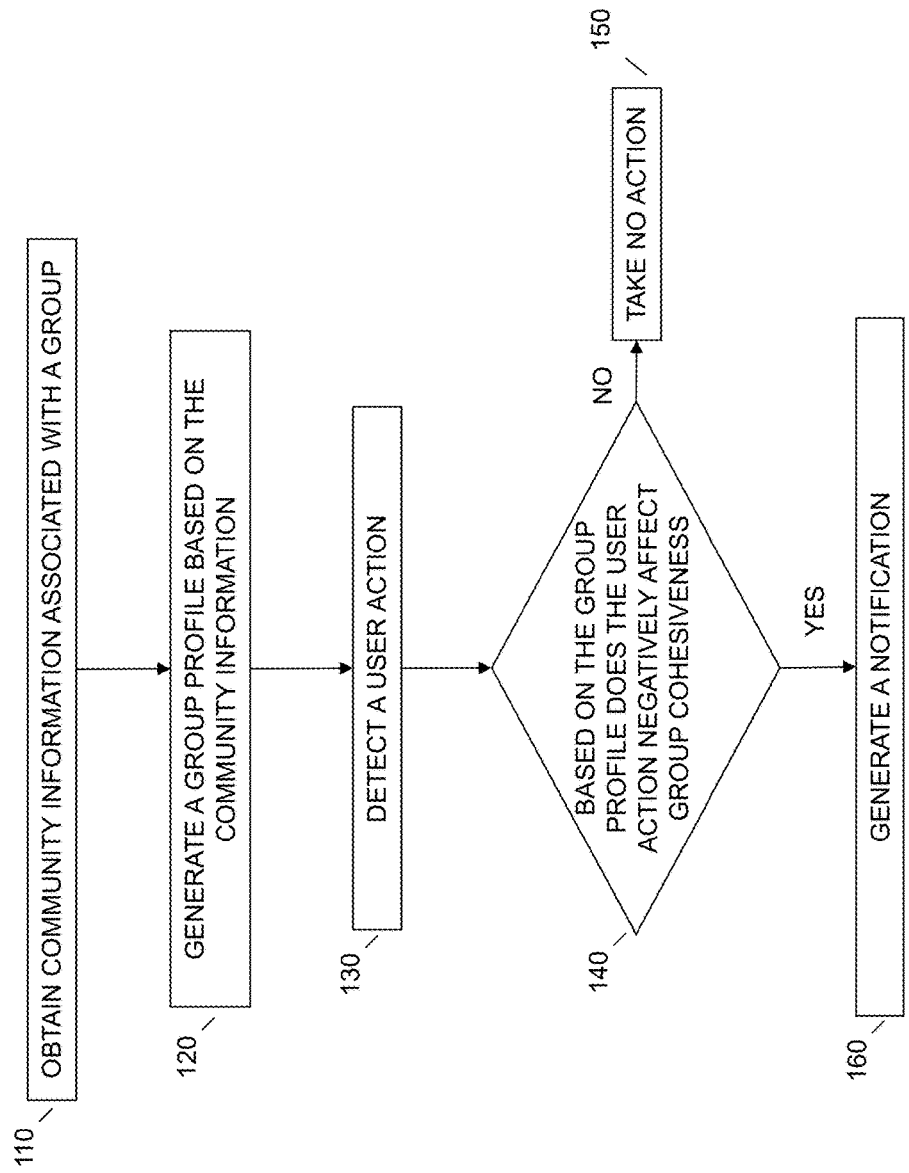
FIG. 1 schematically illustrates a method for monitoring and maintaining social group cohesiveness.
Figure 2:
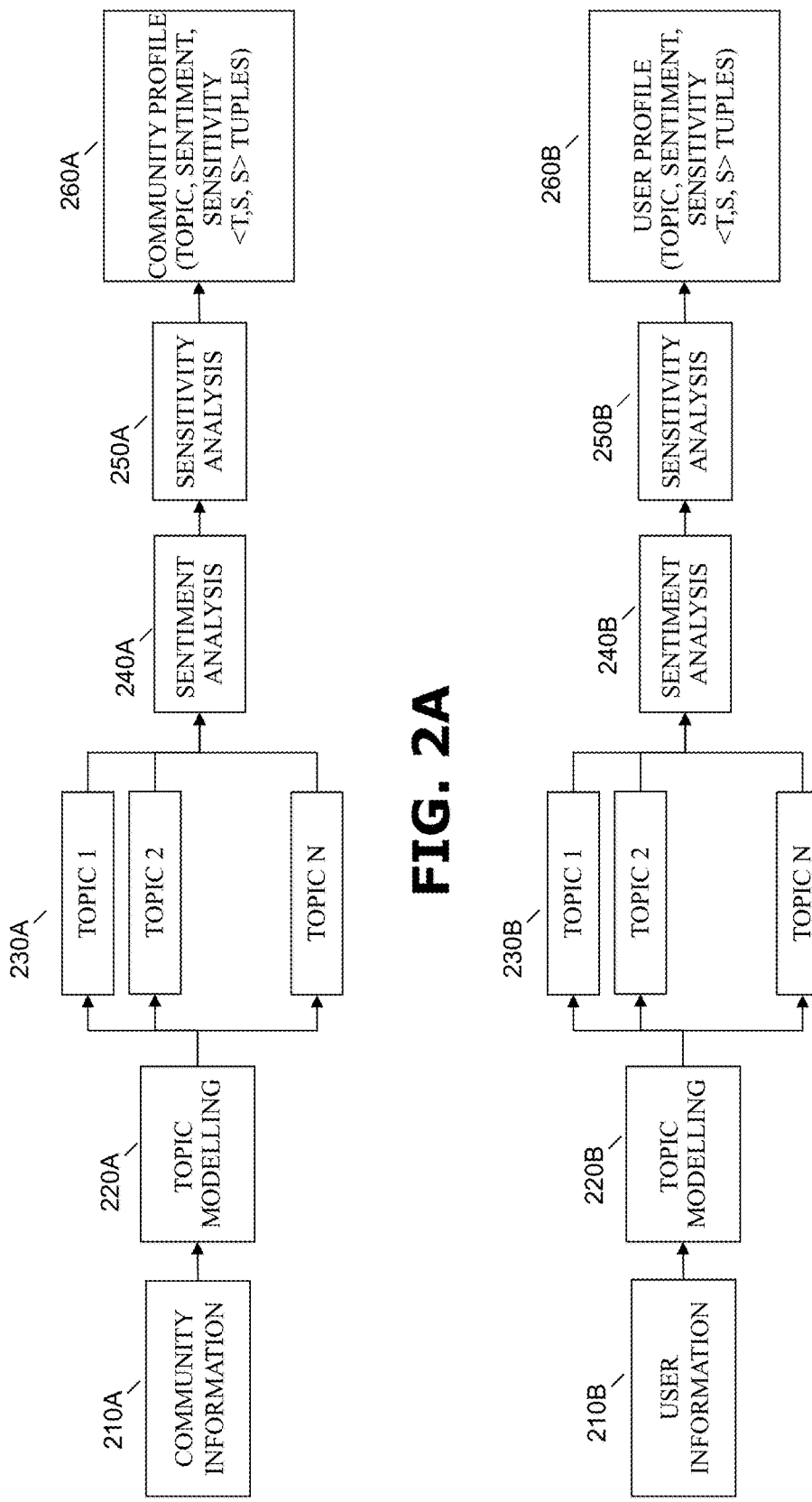
FIG. 2A illustrates an example of generation of a community profile.
FIG. 2B illustrates an example of generation of a user profile.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to the figures. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

As generally stated herein, online social networks have become part of our daily lives. Social networks allow people to form communities based on some association, likeness, relationship, attraction, or, in general, an affinity with a term, concept, or subject. In order for the group to grow and thrive, new members must join and participate. However, it may be difficult to establish or clearly indicate the bounds and focus of an amorphous or complex topic to potential new users. Current applications are generally based on basic meta features (e.g., common friends, interest lists, etc.)

However, recent trends have indicated that information posted to social media has the ability to cause tremendous damage to individuals (e.g., their reputation) and in turn may cause damage to a community as a whole. This may include information that was posted deliberately or unintentionally. Therefore a need exists for a tool that can effectively measure and validate new membership requests, while also continuously monitoring potentially objectionable user activity within a community.

Moreover, the lack of definitive techniques to identify if or how much compatibility exists between a potential new user and an active community, as well as the inability to properly police objectionable behavior within the community can lead to divisiveness and ultimately group breakdown. Specifically, due to a lack of a compatibility measure, irrelevant or subversive users may send membership request to the community and vice-versa. Similarly, without proper knowledge, relevant and productive users may not send or receive membership requests, which can cause the community to atrophy and die from lack of membership growth.

The instances of objectionable behavior or content being posted to social networks have been steadily increasing. Although many sites currently have terms and conditions for participation, users rarely read or fully understand them. Thus, even a group's most active contributing members may post material to the group that violates the terms of service. Thus, a solution that enables a user to review and modify a potential post prior to submission is needed. Furthermore, once something objectionable is posted, typically an administrator must manually remove it. This may require a user to inform the administrator of the existing material. However, this process is not standardized and is generally subject to the discretion of a particular administrator, which can lead to removal of appropriate material or failure to remove objectionable material.

Therefore, one embodiment provides a system to find the cohesiveness between a community and a user who wishes to join the community or is posting some form of content. For example, prior to joining a community, a user and/or a community editor will be prompted with a compatibility score. The compatibility score may be based on a user profile and community profile. Additionally, prior to allowing a user to post within the community (e.g., text post, image post, video post, audio post, etc.), an embodiment may prompt the user in real-time on what the sentiment or predicted sentiment for that post will be within the group.

Referring now to FIG. 1, one embodiment may obtain community information associated with an existing social media group at 110. Social media groups, herein referred to as groups, consist of people who share a common interest or goal. Some non-limiting examples of groups may be groups that form based on political opinions, sports teams, geographic locations, religious beliefs, etc. Typically, the members of these groups share a common ideology or opinion about a topic. In many cases, these opinions are strongly held; thus, an opposing or slanderous comment may create unrest or divisiveness within the group.

In order to ensure group cohesiveness, the community information obtained at 110 is updated and processed periodically (e.g., once an hour, once a day, once a week, etc.) depending on the activity level of the group. In one embodiment, the community description may be updated based current significant topics, events conducted, member information, etc. For example, if a community regularly discusses a specific topic relating to a government agency, the community description may be updated with newly acquired information regarding a recent regulatory change (e.g., a biotechnology regulatory bill regarding genetically modified organisms (GMO)) being issued.

One way to avoid the potential for group infighting, or even group disbandment, is to ensure all members understand the group's current focus or mission statement. It may be possible for a group's dynamic to change overtime and thus the focus or mission statement may need to be updated. Therefore, an embodiment may generate a group profile at 120 based on the obtained community information at 110. The group profile is based on information associated with the group. This information may contain information gathered from community discussions, community topics, external (e.g., third party) reviews or data regarding the group, etc.

This community information is gathered and analyzed. For example, referring briefly to FIG. 2A, the community information which was gathered at 110, is shown at 210A. An embodiment may perform topic modeling at 220A on the community information 210A. The topic modeling may be in the form of Latent Dirichlet Allocation (LDA) or any form of natural language processing. Additionally, one embodiment may perform image analysis on gathered images or videos relating to the group. Once the analysis has been carried out, an embodiment may sort and order the topics at 230A and create tuples based on the ordered topics.

In an embodiment, topic identification may be based on community attributes or topics identified during the above discussed analyzation of the community data. Topics may be identified based on events conducted by the group or people associated with the group, discussion topics within community forums, image based topics, other groups or pages liked by the group or members of the group, etc. For example, optical character recognition and image processing may be carried out on an image a group member posted to a forum relating to a recently elected political figure.

Once the topic modeling and organizing is complete at 230A, a sentiment analysis may be performed on the topic tuples at 240A. For example, an embodiment may utilize a sentiment treebank, which includes fine grained sentiment labels for a large number of phrases in a parse tree of sentences. A further embodiment may utilize a recursive neural tensor network to accurately predict fine-grained sentiment labels for any phase or sentence contained within the community information. Some further non-limiting examples of methods for sentiment analysis of the topics are: Supervised Latent Dirichlet allocation (sLDA), Hierarchical Dirichlet Process-Latent Dirichlet Allocation (HDP-LDA), joint Sentiment/Topic Model (JST), Aspect and Sentiment Unification Model (ASUM), or any method of associating sentiments with identified simple lexicons topics.

Once the sentiment analysis is complete, an embodiment may perform sensitivity analysis at 250A. An embodiment may determine the sensitivity of a topic based a combination of multiple features, e.g., the number of times a topic is discussed (e.g., topic frequency), amount of sentiment expressed, general tone of sentiment expressed, key words used within sentiment expressed, discussion leader or most active participate, events created due to sentiment, relatedness of other relevant topics that have an identified sensitivity level, etc.

Finally, based on the topic modeling 220A, sentiment analysis 240A, and sensitivity analysis 250A, a community profile is generated at 260A and 120. In one embodiment, the community profile may be updated at regular intervals (e.g., daily, weekly, monthly, etc.) or in real time using the steps discussed herein regarding profile generation.

Referring back to FIG. 1, once the community profile is generated at 120, an embodiment may detect a user action at 130. This user action may be, for example, any action that affects the group or group cohesiveness. For simplicity purposes, two major non-limiting examples of potential user actions are discussed at length herein. However, it would be understood to one skilled in the art that these are non-limiting examples, and any type of user action which may have a negative effect on group cohesiveness may be considered.

Figure 3:
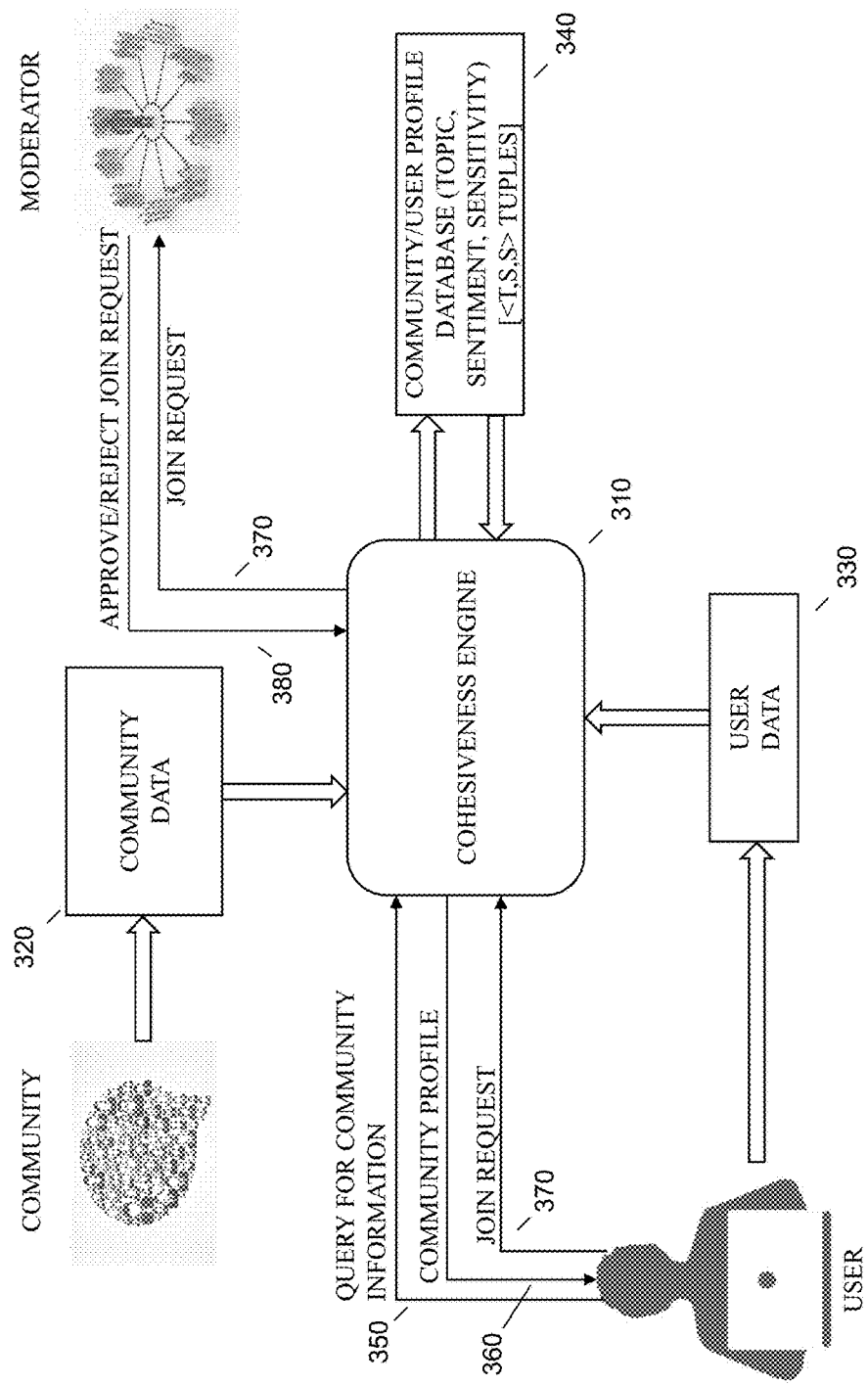
FIG. 3 illustrates an example embodiment for ensuring social group cohesiveness.

Referring to FIG. 3, a first example user action is illustrated. FIG. 3 illustrates an example embodiment where a user is determining if a particular social group would be appropriate for them to join. Generally, a user would simply apply to join a group based on that group's description or user base. Alternatively, an embodiment may provide additional information in order help a user select an appropriate group, while also helping a group make an assessment of a potential new member. In one embodiment, a cohesiveness engine at 310 receives information (e.g., community data 320 and user data 330).

Once the user data 330 and community data 320 are gathered and analyzed by the cohesiveness engine, an embodiment may then store a profile for each in the profile data based at 340. The user data are collected and analyzed similarly to the community data as discussed herein. For example, referring briefly to FIG. 2B, the user information (e.g., data) is gathered at 210B. The user information may be any information gathered from discussions the user was involved in, topic threads the user has been active in, general topics of communities the user is or was at one time a member of, other user reviews or comments regarding the user's actions within a group setting, etc.

An embodiment may perform topic modeling of the gathered user information at 220B. The topic modeling may be in the form of LDA or any form of natural language processing. Additionally, one embodiment may perform image analysis on gathered images or videos relating to or posed by the user. Once the analysis has been carried out, an embodiment may sort and order the topics at 230B and create tuples based on the ordered topics.

In an embodiment, topic identification may be based on user characteristics associated with a user's online identity or topics identified during the analysis of the user information, as discussed above. Topics may be identified based on events in which a user participated, people with whom the user associates (e.g., is friends with, shares a common group with, shares common friends with, etc.), forum discussion topics the user has participated in or viewed, images posted or liked by a user, other groups or users that like or friend the user, etc. For example, optical character recognition and image processing may be carried out on an image a user posted to a public forum relating to a recently elected political figure. Combined with other factors known about a user, an embodiment may be able to determine a user's political affiliation or preference.

Once the topic modeling and organizing are complete at 230B, a sentiment analysis may be performed on the topic tuples at 240B. For example, an embodiment may utilize a sentiment treebank, which includes fine grained sentiment labels for a large number of phrases in a parse tree of sentences. A further embodiment may utilize a recursive neural tensor network to accurately predict fine-grained sentiment labels for any phase or sentence contained within the user information. Some further non-limiting examples of methods for sentiment analysis of the topics are: Supervised Latent Dirichlet allocation (sLDA), Hierarchical Dirichlet Process-Latent Dirichlet Allocation (HDP-LDA), joint Sentiment/Topic Model (JST), Aspect and Sentiment Unification Model (ASUM), or any method of associating sentiments with identified simple lexicons topics.

Once the sentiment analysis is complete, an embodiment may perform sensitivity analysis at 250B. An embodiment may determine the sensitivity of a topic based a combination of multiple factors (e.g., number of times a user participated in a forum or conversation relating to a specific topic (e.g., historical topic frequency), amount of sentiment expressed in the user's general activity, general tone of user sentiment expressed, key words used within sentiment expressed, discussion leader or most active participate in discussions the user was involved in, events created due to user sentiment, relatedness of other relevant topics that have an identified sensitivity level to known user topics, etc.).

Finally, based on the topic modeling 220B, sentiment analysis 240B, and sensitivity analysis 250B, a user profile is generated at 260B. In one embodiment, the user profile may be updated at regular intervals (e.g., daily, weekly, monthly, etc.) or in real-time using the steps discussed herein regarding profile generation.

Referring back to FIG. 3, in an embodiment, the cohesiveness engine 310 may store the determined profiles in a database at 340. In addition to the profiles, the database may also contain detailed information about the community or user (e.g., general topic sentiment, general sensitivity, etc.) which may be stored as tuples. Using this database of stored profile information, an embodiment may accurately predict when a user action may have a negative effect on group cohesiveness.

By way of example, an embodiment may receive a user request relating to a specific social group (e.g., a query for community information at 350). The cohesiveness engine 310 then references the profile database 340 and returns a community profile to the user at 360. In a further embodiment, the community profile may be displayed as a notification to a user on an electronic device. Based on the displayed profile information, a user may determine that the group does not align with their particular viewpoints. Based on the results, a user may determine if they would be a good match for the specific social group. Additionally or alternatively, the community profile may be a cohesiveness rating which takes into account the user profile based on the user data 330.

Based on the community profile 360 or the cohesiveness rating, a user may decide to submit a request to join the community at 370. In one embodiment, the cohesiveness engine 310 may determine, based on the community profile alone or in combination with the user, if the user would be a cohesive member of the group. For example, if it is determined that the user is active in opposing groups, or has posted information in a public forum that would be considered divisive to the group, the user may be denied entry to the group. In a further embodiment, the join request may be forwarded to a moderator at 370. The moderator may then, based on the determinations of the cohesiveness engine, approve or reject the user's join request a 380.

Figure 4:
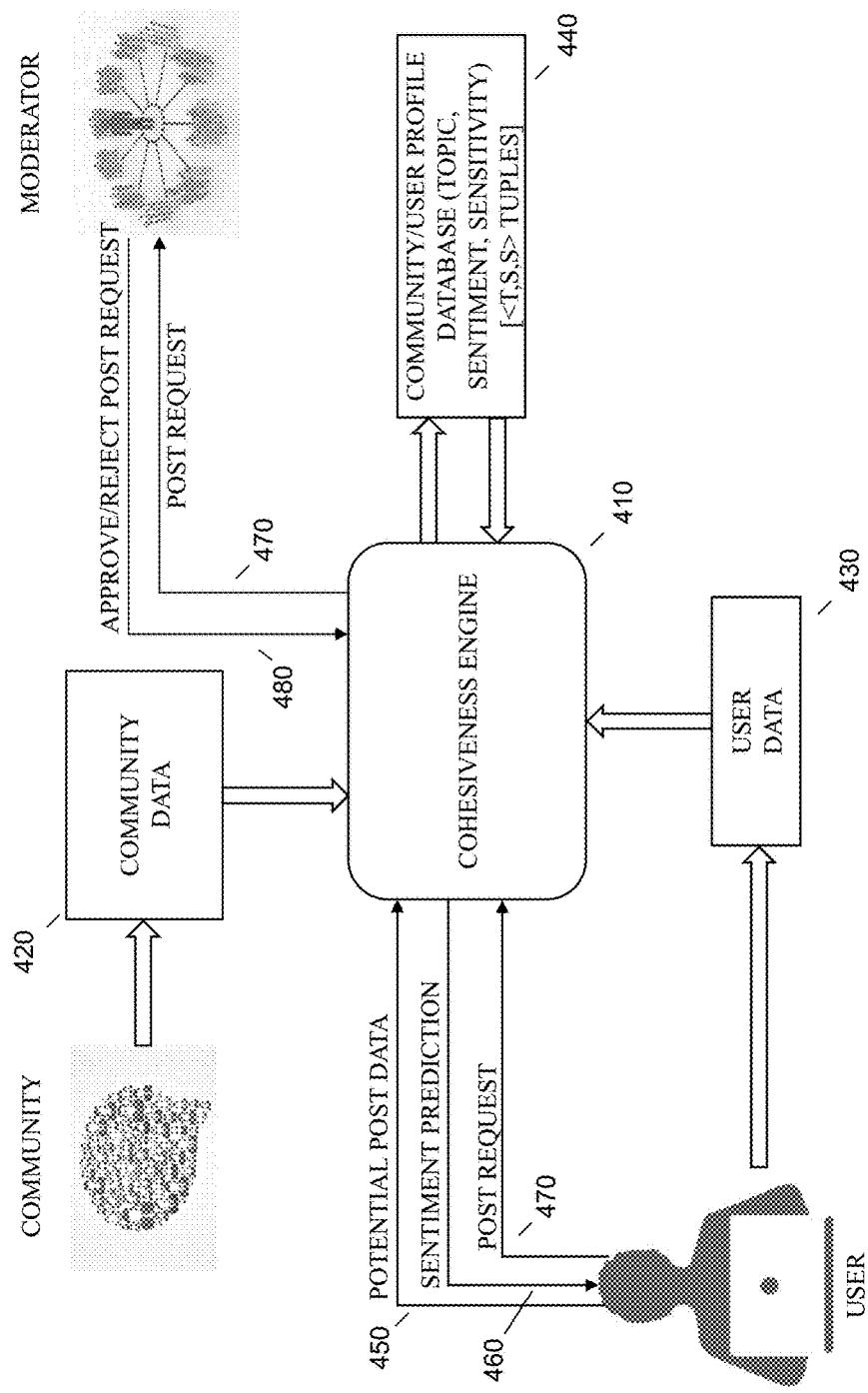
FIG. 4 illustrates another example embodiment for ensuring social group cohesiveness.

Referring to FIG. 4, a second example user action is illustrated. FIG. 4 illustrates an example embodiment where a user desires to submit a potential post to a group at 450. Currently, two general checks are in place for policing user post activity. In some groups, posts must be read and approved by a moderator prior to being publicly displayed (e.g., within the group). In other groups, a user's post may go public immediately, but be subject to removal by a moderator if the post is reported by other users or viewed negatively by the moderator. However, both of these solutions are human intensive.

Moreover, this does not help a user determine how a post is likely to be viewed by the collective group. For example, a user may wish to be a positive and contributing member of a group, but inadvertently post material that is deemed offensive or divisive within the group. This may not only have a negative impact on the group's overall cohesiveness, but also negatively impacts the user's overall perception within the group. Thus, an embodiment may utilize the cohesive engine 410 to predict the sentiment of a potential user post and pass it along to the user at 460. Based on this sentiment prediction, a user may decide to alter text of the post, or simply not submit the post at all. As discussed herein, an embodiment may provide this information because the cohesiveness engine 410 receives information (e.g., community data 420 and user data 430) allowing it to generate and store associated profiles at 440.

In addition to informing the user of the potential impacts of their post, an embodiment may also use the cohesiveness engine determination to alert a moderator of a potentially divisive post. This ensures some level of human oversight is still present in the process, however it removes the requirement for a moderator to approve each post, which may be extremely labor intensive. For example, an embodiment may alert a moderator of a post request (e.g., if a post has the potential to have a negative effect on group cohesiveness) at 470, and the moderator may review the post and approve or reject the post at 480.

Thus, returning to FIG. 1, an embodiment may determine, based on the group profile if the user action (e.g., a request to join the group, a request to post information within the group, etc.) negatively affects group cohesiveness at 140. If it is determined that the user action would not have a negative effect on the group cohesiveness, no action is required at 150. Alternatively, if the cohesiveness engine determines that the action would negatively impact the group, it may generate a notification (e.g., to the user or moderator) at 160.

Figure 5:
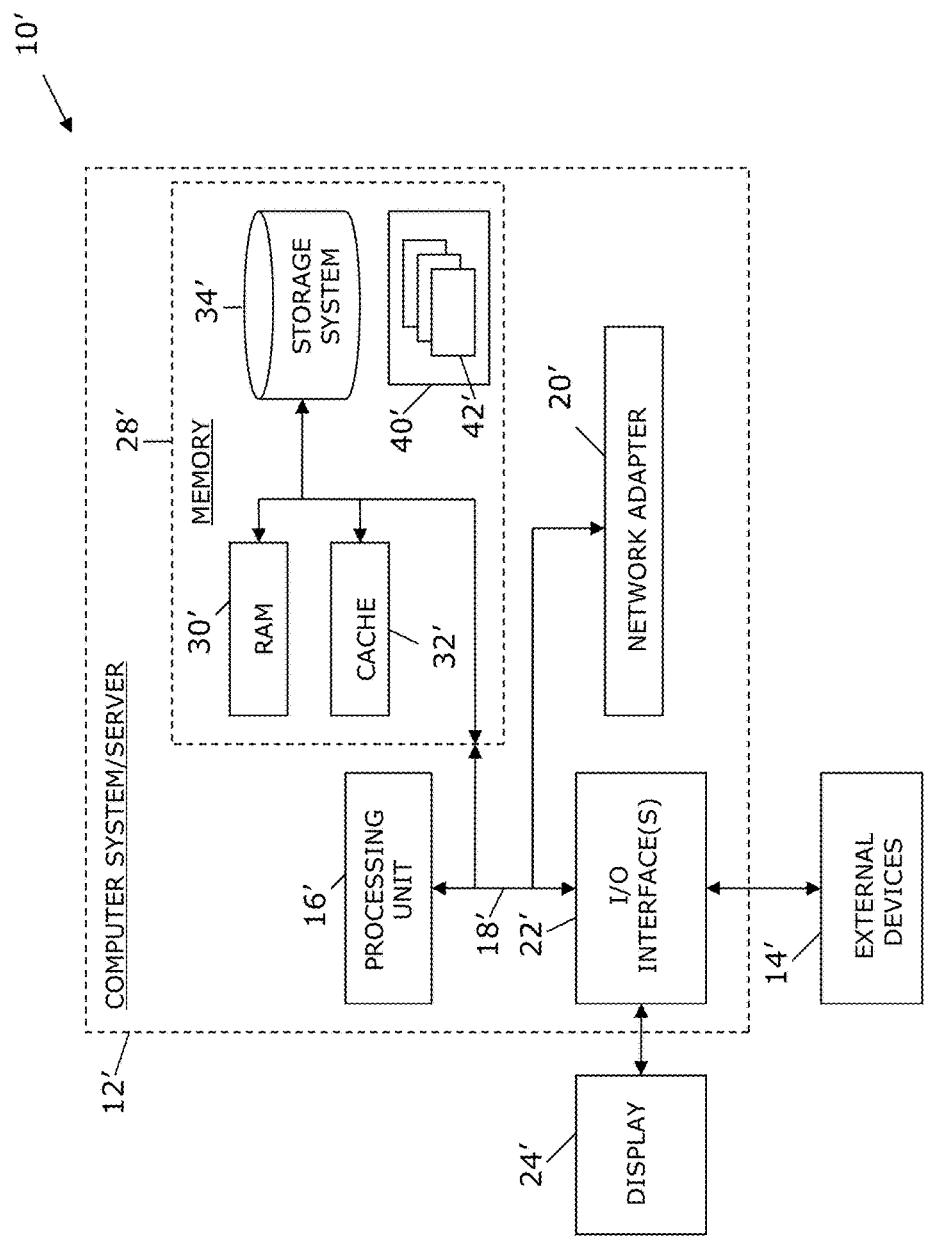
FIG. 5 illustrates an example computer system.

Referring now to FIG. 5, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for monitoring and maintaining social group cohesiveness, the method comprising:
    utilizing at least one processor to execute computer code that performs the steps of:
    obtaining user information associated with user activity;
    generating, based on the user information, a user profile;
    obtaining community information associated with a group;
    generating, based on the community information, a group profile, wherein the group profile identifies common interests between members in the group;
    detecting a user action provided by a user to the group;
    determining, based on the group profile and the user profile and prior to transmitting the user action to the group, if the user action negatively affects group cohesiveness; and
    generating, responsive to determining that the user action negatively affects the group cohesiveness, a notification.

2. The method of claim 1, wherein the user action comprises user input indicating an interest in joining the group.

3. The method of claim 1, wherein the user action comprises submission of a user post.

4. The method of claim 3, wherein the notification identifies a portion of the user post as negatively affecting social group cohesiveness.

5. The method of claim 1, wherein the notification comprises a notification to a moderator of the group.

6. The method of claim 1, wherein the notification comprises a notification to the user.

7. The method of claim 1, wherein the notification identifies the user action as having no negative effect on social group cohesiveness.

8. An apparatus for monitoring and maintaining social group cohesiveness, the apparatus comprising:
    at least one processor; and
    a computer readable storage medium having computer readable program code embodied therewith and executable by the at least one processor, the computer readable program code comprising:
    computer readable program code that obtains user information associated with user activity;
    computer readable program code that generates, based on the user information, a user profile;
    computer readable program code that obtains community information associated with a group;
    computer readable program code that generates, based on the community information, a group profile, wherein the group profile identifies common interests between members in the group;
    computer readable program code that detects a user action provided by a user to the group;
    computer readable program code that determines, based on the group profile and the user profile and prior to transmitting the user action to the group, if the user action negatively affects group cohesiveness; and computer readable program code that generates, responsive to determining that the user action negatively affects the group cohesiveness, a notification.

9. A computer program product for monitoring and maintaining social group cohesiveness, the computer program product comprising:
   a computer readable storage medium having computer readable program code embodied therewith, the computer readable program code comprising:
   computer readable program code that obtains user information associated with user activity;
   computer readable program code that generates, based on the user information, a user profile;
   computer readable program code that obtains community information associated with a group;
   computer readable program code that generates, based on the community information, a group profile, wherein the group profile identifies common interests between members in the group;
   computer readable program code that detects a user action provided by a user to the group;
   computer readable program code that determines, based on the group profile and the user profile and prior to transmitting the user action to the group, if the user action negatively affects group cohesiveness; and
   computer readable program code that generates, responsive to determining that the user action negatively affects the group cohesiveness, a notification.

10. The computer program product of claim 9, wherein the user action comprises user input indicating an interest in joining the group.

11. The method of claim 9, wherein the user action comprises submission of a user post.

12. The computer program product of claim 11, wherein the notification identifies a portion of the user post as negatively affecting social group cohesiveness.

13. The computer program product of claim 9, wherein the notification comprises a notification to a moderator of the group.

14. The computer program product of claim 9, wherein the notification comprises a notification to the user.

15. The computer program product of claim 9, wherein the notification identifies the user action has having no negative effect on social group cohesiveness.

* * * * *